United States Patent
Leu

(10) Patent No.: US 7,413,598 B2
(45) Date of Patent: Aug. 19, 2008

(54) MOLD AND METHOD FOR MANUFACTURING THE SAME

(75) Inventor: Charles Leu, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 269 days.

(21) Appl. No.: 11/288,650

(22) Filed: Nov. 28, 2005

(65) Prior Publication Data

US 2006/0112854 A1 Jun. 1, 2006

(30) Foreign Application Priority Data

Nov. 26, 2004 (CN) .................. 2004 1 0052513

(51) Int. Cl.
*B28B 7/28* (2006.01)
*C04B 35/00* (2006.01)

(52) U.S. Cl. ............... 106/38.9; 501/95.1; 977/734; 977/701

(58) Field of Classification Search ............ 977/734, 977/736; 428/408, 457
See application file for complete search history.

(56) References Cited

U.S. PATENT DOCUMENTS 4,921,822 A * 5/1990 Luthra ............... 501/95.2
5,552,352 A * 9/1996 Brun et al. ............. 501/88

FOREIGN PATENT DOCUMENTS

| CN | 1241640 A | 1/2000 |
|---|---|---|
| CN | 1470617 A | 1/2004 |

OTHER PUBLICATIONS

L. Duclaus, B. Nystue and J.P. Issi, Phys. Rev. B 46 (1992), p. 3362.*
W. Mickelson, S. Aloni, Wei-Qiang Han, John Cumings, A. Zettl, Packing 60 In Boron Nitride Nanotubes, Science, Apr. 18, 2003, 467-469, vol. 300, USA.

* cited by examiner

*Primary Examiner*—Jerry Lorengo
*Assistant Examiner*—Noah S Wiese
(74) *Attorney, Agent, or Firm*—Morris Manning Martin LLP; Tim Tingkang Xia, Esq.

(57) ABSTRACT

The present invention discloses a mold and a method of manufacturing the mold. The mold includes a mold matrix and a number of boron nitride nanotubes sintered together with the mold matrix. Each boron nitride nanotube capsules a number of fullerenes therein respectively. The mold further includes an amount of noble metal powder sintered together with the mold matrix and the boron nitride nanotubes. The fullerenes preferably include $C_{60}$ molecules. In addition, the method for manufacturing a mold includes the steps of: providing a number of boron nitride nanotubes, each boron nitride nanotube capsuling a number of fullerenes therein respectively; mixing a mold matrix with the boron nitride nanotubes capsuling the fullerenes to form a complex; molding the complex to form a mold preform; and sintering the mold preform, thereby attaining a mold.

20 Claims, 3 Drawing Sheets

```
providing a plurality of boron nitride nanotubes, each
boron nitride nanotube capsuling a plurality of
fullerenes therein respectively
                    │
                    ▼
mixing a mold matrix with the boron nitride nanotubes
capsuling the fullerenes to form a complex
                    │
                    ▼
molding the complex to form a mold preform
                    │
                    ▼
sintering the mold preform, thereby attaining the mold
```

FIG. 3

MOLD AND METHOD FOR MANUFACTURING THE SAME

TECHNICAL FIELD

The present invention relates to molds such as those used for making glass pieces, and more particularly to a mold using a mold and a method of manufacturing the mold.

BACKGROUND

Glass optical articles, especially aspheric glass lenses, are widely used in digital cameras, video recorders, compact disc players and other optical systems due to their excellent optical performance. At present, a molding process is commonly used for the manufacturing of glass optical articles. In the molding process, a mold generally is used for molding the glass optical pieces.

In general, molds are exposed to repeated impacts and high temperatures. Thus these molds should have characteristics such as excellent hardness, high heat resistance, high wear resistance, high compressive strength, easy separability, mirror surface workability, etc. A variety of suitable materials may be applied for construction of the mold; for example, grasslike or vitreous carbon, silicon carbide, silicon nitride, and a mixture containing silicon carbide. However, the materials have a common shortcoming; i.e., low thermal shock resistance. In addition, the materials may be easily oxidized due to being subjected to high temperatures in air.

Furthermore, the use of multi-layer coatings covered with the ceramics such as Ti (C, N), $Al_2O_3$ on the surface of the carbides is increasing. As a result, some surface characteristics of the molds, for example hardness and wear resistance, may be improved. However, it is generally difficult to tightly adhere the multi-layer coating to a mold matrix due to incompatible properties between different materials. In addition, such a coating also increases the complexity and cost of the molding process.

What is needed, therefore, is a mold that has high chemical stability and high thermal shock resistance under repetitive impact and high temperature operating conditions.

What is also needed, therefore, is a method of manufacturing the above-described mold at low cost.

SUMMARY

In a preferred embodiment of the present invention, a mold includes a mold matrix and a number of boron nitride nanotubes sintered together with the mold matrix. Each boron nitride nanotube capsules a number of fullerenes therein respectively. The mold further includes an amount of noble metal powder sintered together with the mold matrix and the boron nitride nanotubes.

The noble metal powder is generally comprised of a material selected from the group consisting of platinum, iridium, rhenium, and any alloy thereof. The mold matrix is typically comprised of a material selected from the group consisting of tungsten carbide, silicon carbide, titanium carbide, molybdenum carbide, vanadium carbide, cobalt carbide, and silicon nitride. In addition, the boron nitride nanotubes have an inner diameter in the range from about 0.6 nanometers to about 20 nanometers. The fullerenes have a given number of carbon atoms in the range from 20 to 120, and preferably include $C_{60}$ molecules.

A method for manufacturing a mold, in accordance with another preferred embodiment of the present invention, includes the steps of: providing a number of boron nitride nanotubes, each boron nitride nanotube capsuling a number of fullerenes therein respectively; mixing a mold matrix with the boron nitride nanotubes capsuling the fullerenes to form a complex; molding the complex to form a mold preform; and sintering the mold preform, thereby attaining a mold. The method further includes the step of adding an amount of noble metal powder into the mold matrix while mixing the mold matrix and the boron nitride nanotubes. The noble metal powder is preferably comprised of a material selected from the group consisting of platinum, iridium, rhenium, and any suitable alloy thereof.

Furthermore, the boron nitride nanotubes capsuling the fullerenes therein are provided by a method comprising the steps of: providing a number of boron nitride nanotubes having two ends; opening at least one end of the boron nitride nanotubes; and capsuling the fullerenes into the boron nitride nanotubes by a vacuum heating method. The vacuum heating method generally uses temperatures in the range from about 550° C. to about 630° C. for 24 hours to 48 hours.

The method further includes the step of forming a given curved forming shape on a surface of the mold. The given curved forming shape is designed to being suitable to a surface of an optical element.

Compared with traditional molds, the mold in the preferred embodiment of the invention includes the boron nitride nanotubes capsuling a number of fullerenes therein. By utilizing characteristics of the boron nitride nanotubes, for example high chemical stability, high wear resistance and strong thermal shock resistance; the corresponding characteristics of the mold can be improved. Furthermore, friction resistance characteristics of the boron nitride nanotubes are helpful for releasing of the mold from a molding machine. In addition to the boron nitride nanotubes, the noble metal powder further contributes to convenient releasing of the mold from a molding machine.

In conclusion, the method of manufacturing a mold provides convenient releasing of the mold from a molding machine, particularly because of the friction resistance characteristics of the boron nitride nanotubes. Further, because the method comprises an easily performed mixing process, sintering process, and molding process, the method is inexpensive.

Other advantages and novel features will be drawn from the following detailed description of preferred embodiments when conjunction with the attached drawings, in which:

BRIEF DESCRIPTION OF THE DRAWINGS

FIG. 3 is a flow chart of a method for manufacturing a mold according to still another preferred embodiment of the present invention.

DETAILED DESCRIPTION OF THE EMBODIMENTS

Embodiments of the present invention will now be described in detail below and with reference to the drawings.

Figure 1:
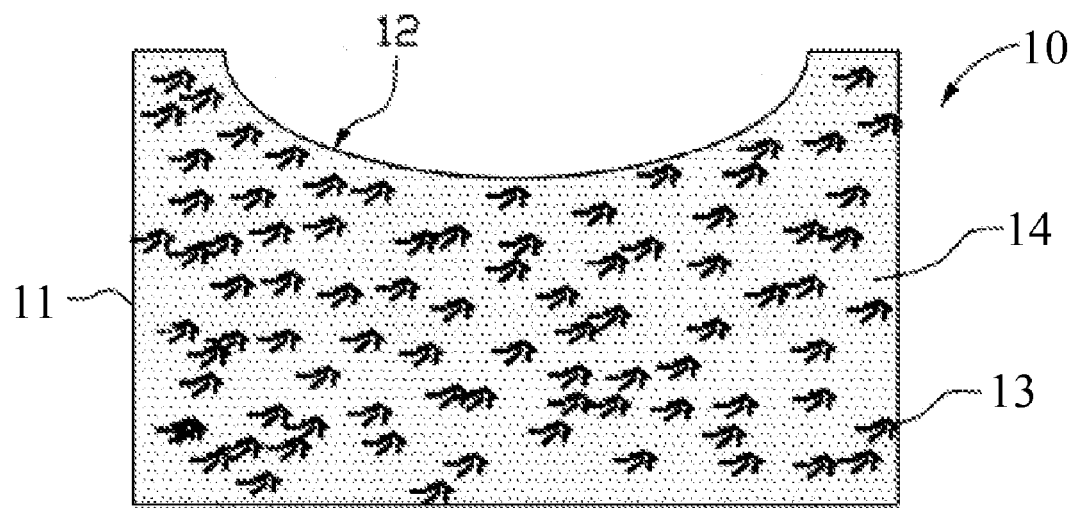
FIG. 1 is a schematic, cross-sectional view of a mold according to a preferred embodiment of the present invention.

According to a preferred embodiment of the present invention, referring to FIG. 1, a mold 10 generally includes a mold matrix 11 and a number of boron nitride nanotubes 13 sintered together with the mold matrix 11. The mold 10 further includes an amount of noble metal powder 14 sintered together with the mold matrix 11. Preferably, the boron nitride nanotubes 13 and noble metal powder 14 are embedded uniformly into the mold matrix 11. In addition, the mold 10 has a curved molding surface 12 corresponding to a desired surface of an optical element that is formed by the mold 10.

Depending on performance requirements such as heat resistance, hardness, compression resistance, etc., the mold matrix 11 is generally selected from various kinds of ceramic materials and hardness alloys. For example, the mold matrix 11 can be comprised of a material selected from the group consisting of tungsten carbide, silicon carbide, titanium carbide, molybdenum carbide, vanadium carbide, cobalt carbide, and silicon nitride.

In addition, the boron nitride nanotubes 13 are comprised of a material selected from the group consisting of single-wall boron nitride nanotubes, double-wall boron nitride nanotubes, mult-wall boron nitride nanotubes, and other kinds of boron nitride nanotubes. The boron nitride nanotubes 13 have an average diameter in the range from about 0.6 nanometers to about 20 nanometers.

The noble metal powder 14 is comprised of a material selected from the group consisting of platinum, iridium, rhenium, and any suitable alloy thereof. The noble metal powder 14 has an average particle dimension in the range from about 1 nanometer to about 100 nanometers.

Figure 2A:
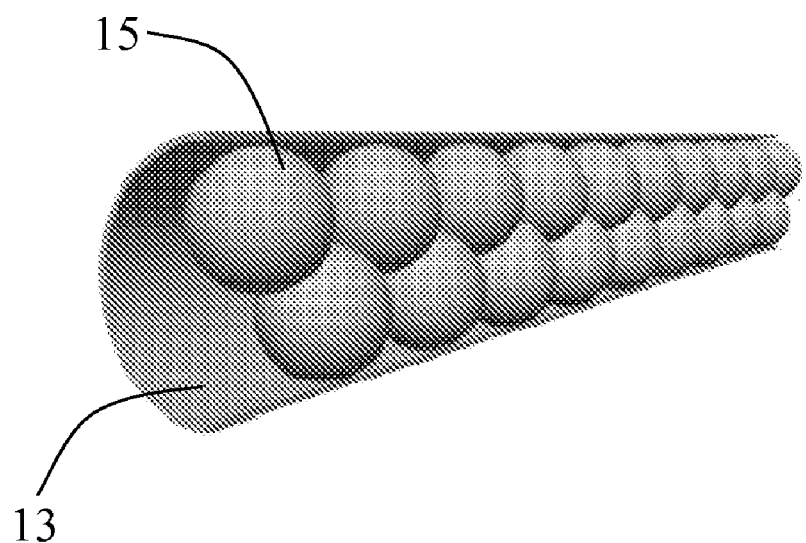
FIG. 2A is a schematic view of microstructure of a boron nitride nanotube capsuling a number of fullerenes therein according to the preferred embodiment of the present invention.
Figure 2B:
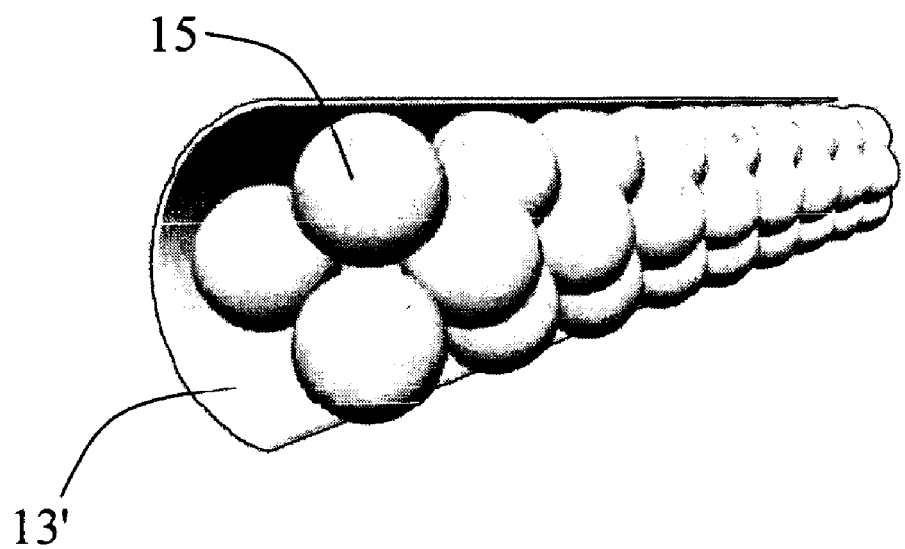
FIG. 2B is a schematic view of microstructure of a boron nitride nanotube capsuling a number of fullerenes therein according to an alternative embodiment of the present invention.
Figure 2C:
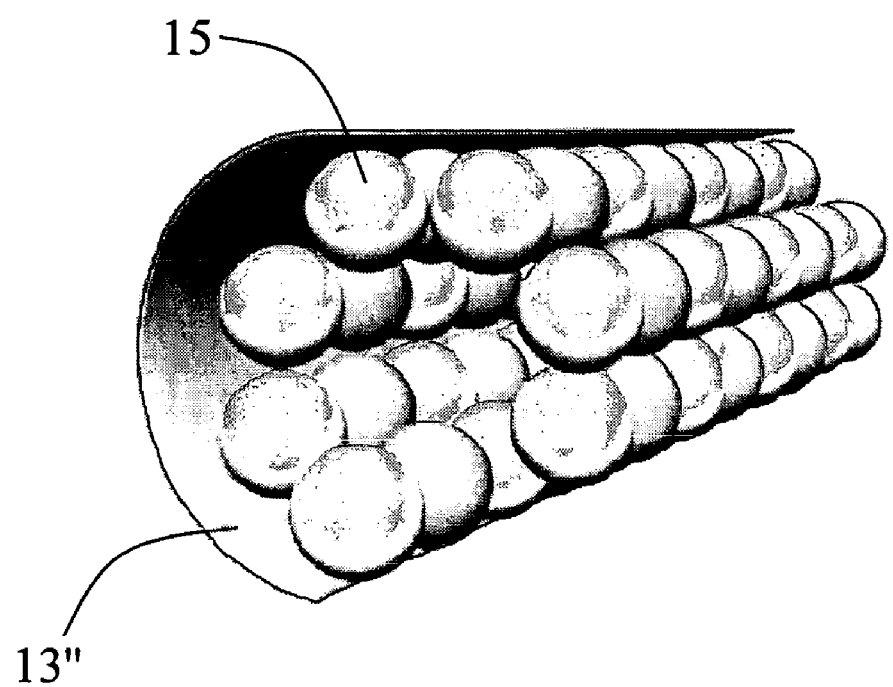
FIG. 2C is a schematic view of microstructure of a boron nitride nanotube capsuling a number of fullerenes therein according to another alternative embodiment of the present invention.

Referring to FIG. 2A, each boron nitride nanotube 13 capsules a number of fullerenes 15 therein. The boron nitride nanotube 13 has a relatively small diameter, then capsuling two linear chains of evenly spaced fullerenes 15. Alternatively, the capsuling of fullerenes 15 in the boron nitride nanotube 13 can follow other patterns. For example, referring to FIG. 2B, a boron nitride nanotube 13' might capsule more fullerenes 15 due to a large diameter of the boron nitride nanotube 13'. Furthermore, the stacking of fullerenes 15 may be arranged in a disorderly fashion. In another example, referring to FIG. 2C, a boron nitride nanotube 13" has a larger diameter than the diameter of the boron nitride nanotube 13'. Thus, the boron nitride nanotube 13" can capsule a number of fullerenes 15 attached on an inner surface of the boron nitride nanotube 13". The fullerenes 15 may be arranged in a spiral configuration (see seven white or black fullerenes 15 as illustrated in FIG. 2C) along the inner surface of the boron nitride nanotube 13". Note that the illustrated fullerenes are the same as the fullerenes shown in FIG. 2A and FIG. 2B, but are colored to indicate the spiral configuration. Such an arrangement results in a hollow core along the axis of the boron nitride nanotube 13".

The fullerenes 15 generally include various fullerene molecules having different numbers of carbon atoms in the range from 20 to 120, even above 120, for example, $C_{20}$, $C_{40}$, $C_{60}$, $C_{70}$, $C_{80}$, $C_{120}$, etc. In general, a fullerene molecule appears as a closed hollow spheroid composed of carbon atoms and can be classified according to the numbers of carbon atom it has. For example, fullerenes (i.e., $C_{20}$, $C_{40}$, $C_{60}$), high fullerenes (i.e., $C_{70}$, $C_{80}$), and giant fullerenes (i.e., $C_{120}$). In addition, the different fullerene molecules can exhibit a variety of configurations such as cone-like fullerenes, fullerene tori, and fullerene spindles, but still are composed of pentagons and hexagons of carbon atoms. In general, a typical $C_{60}$ fullerene exhibits high chemical stability and superior mechanical performance compared to other fullerenes. Thus, in the preferred embodiment, the fullerenes 15 preferably include $C_{60}$ molecules (i.e., Buckyballs or Buckminster fullerenes). A typical $C_{60}$ molecule has a diameter of about 0.71 nanometers. However, other fullerenes containing above 60 carbon atoms generally have different diameters in the range from about 1 nanometer to about 20 nanometers. Thus, in order to capsule the fullerenes 15, the boron nitride nanotubes 13 must have larger inner diameters than diameters of the fullerenes 15.

Referring to FIG. 3, in another preferred embodiment, a method for manufacturing a mold includes the steps of: (a) providing a number of boron nitride nanotubes, each boron nitride nanotube capsuling a number of fullerenes therein respectively; (b) mixing a mold matrix with the boron nitride nanotubes capsuling the fullerenes to form a complex; (c) molding the complex to form a mold preform; and (d) sintering the mold preform, thereby attaining a mold.

Further details regarding the step (a) can be found in an article entitled "Packing $C_{60}$ in Boron Nitride Nanotubes," Science, V. 300, PP. 467-469, Apr. 18, 2003. In particular, step (a) comprises the steps of: providing a number of boron nitride nanotubes having two ends; opening at least one end of the boron nitride nanotubes; and capsuling the fullerenes into the boron nitride nanotubes by a vacuum heating method. Generally, the boron nitride nanotubes can be obtained by a plasma-arc discharge method. The ends of the boron nitride nanotubes are opened by a heat treatment method in air at 800° C. for 20 minutes. In addition, the vacuum heating method generally uses temperatures in the range from about 550° C. to about 630° C. for 24 hours to 48 hours.

Step (b) preferably further includes the step of adding an amount of noble metal powder into the mold matrix while mixing the mold matrix with the boron nitride nanotubes. Thus, the noble metal powder and the boron nitride nanotubes are embedded uniformly into the mold matrix. This is helpful for releasing of the mold from a molding machine. The noble metal powder is generally comprised of a material selected from the group consisting of platinum, iridium, rhenium, and any suitable alloy thereof.

In step (c), the molding process generally includes compression molding, injection molding, extrusion molding processes, etc. The molding process is preferably a compression molding process.

In step (d), the sintering process is preferably achieved at a high temperature generally in the range from about 400° C. to about 1000° C.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A mold comprising:
    a mold matrix; and
    a plurality of boron nitride nanotubes and an amount of noble metal powder sintered together with and uniformly distributed in the mold matrix, each boron nitride nanotube capsuling a plurality of fullerenes therein.

2. The mold as claimed in claim 1, wherein the noble metal powder is comprised of a material selected from the group consisting of platinum, iridium, rhenium, and an alloy thereof.

3. The mold as claimed in claim 1, wherein the mold matrix is comprised of a material selected from the group consisting of tungsten carbide, silicon carbide, titanium carbide, molybdenum carbide, vanadium carbide, cobalt carbide, and silicon nitride.

4. The mold as claimed in claim 1, wherein the boron nitride nanotubes are comprised of a material selected from the group consisting of single-wall boron nitride nanotubes, double-wall boron nitride nanotubes, and multi-wall boron nitride nanotubes.

5. The mold as claimed in claim 1, wherein the boron nitride nanotubes have an inner diameter in the range from about 0.6 nanometers to about 20 nanometers.

6. The mold as claimed in claim 1, wherein the fullerenes each have a number of carbon atoms in the range from 20 to 120.

7. The mold as claimed in claim 1, wherein the fullerenes comprise $C_{60}$ molecules.

8. A method for manufacturing a mold, comprising the steps of:
providing a plurality of boron nitride nanotubes and an amount of noble metal powder, each boron nitride nanotube capsuling a plurality of fullerenes therein respectively;
mixing a mold matrix with the boron nitride nanotubes capsuling the fullerenes and the noble metal powder to form a complex;
molding the complex to form a mold preform; and
sintering the mold preform, thereby attaining the mold.

9. The method as claimed in claim 8, wherein the noble metal powder is comprised of a material selected from the group consisting of platinum, iridium, rhenium, and an alloy thereof.

10. The method as claimed in claim 8, wherein the boron nitride nanotubes capsuling fullerenes therein are provided by a method comprising the steps of: providing a plurality of boron nitride nanotubes having two ends; opening at least one end of the boron nitride nanotubes; and capsuling the fullerenes into the boron nitride nanotubes by a vacuum heating method.

11. The method as claimed in claim 10, wherein the vacuum heating method uses temperatures in the range from about 550° C. to about 630° C. for 24 hours to 48 hours.

12. The method as claimed in claim 8, further comprising the step of: forming a given curved molding shape on a surface of the mold, the curved molding shape being suitable for forming a surface of an optical element to be molded by the mold.

13. The method as claimed in claim 8, wherein the mold matrix is comprised of a material selected from the group consisting of tungsten carbide, silicon carbide, titanium carbide, molybdenum carbide, vanadium carbide, cobalt carbide, and silicon nitride.

14. The method as claimed in claim 8, wherein the boron nitride nanotubes have an inner diameter in the range from about 0.6 nanometers to about 20 nanometers.

15. The method as claimed in claim 8, wherein the fullerenes each have a number of carbon atoms in the range from 20 to 120.

16. The method as claimed in claim 8, wherein the fullerenes comprise $C_{60}$ molecules.

17. A method for manufacturing a mold material, comprising the steps of:
preparing a plurality of boron nitride nanotubes and an amount of noble metal powder; mixing said plurality of boron nitride nanotubes and said noble metal powder into a mold matrix to form a complex; and
sintering said complex so as to acquire said mold material.

18. The method as claimed in claim 17, wherein each of said plurality of boron nitride nanotubes contains a plurality of fullerenes therein.

19. The mold as claimed in claim 1, wherein the boron nitride nanotubes are uniformly distributed among the noble metal powder in the mold matrix.

20. The method as claimed in claim 17, wherein said boron nitride nanotubes are uniformly distributed among said noble metal powder in said mold matrix.

* * * * *